United States Patent
Wolfe et al.

(10) Patent No.: US 7,392,426 B2
(45) Date of Patent: Jun. 24, 2008

(54) REDUNDANT PROCESSING ARCHITECTURE FOR SINGLE FAULT TOLERANCE

(75) Inventors: Jeffrey M. Wolfe, Bradenton, FL (US); Jason L. Copenhaver, Sarasota, FL (US); Jeremy Ramos, Clearwater, FL (US)

(73) Assignee: Honeywell International Inc., Morristown, NJ (US)

( * ) Notice: Subject to any disclaimer, the term of this patent is extended or adjusted under 35 U.S.C. 154(b) by 515 days.

(21) Appl. No.: 10/867,894

(22) Filed: Jun. 15, 2004

(65) Prior Publication Data

US 2005/0278567 A1 Dec. 15, 2005

(51) Int. Cl.
*G06F 11/00* (2006.01)

(52) U.S. Cl. .......................................... 714/11

(58) Field of Classification Search .................. 714/12, 714/11, 25, 725, 797; 701/39, 43, 114; 326/11
See application file for complete search history.

(56) References Cited

U.S. PATENT DOCUMENTS

| | | | | |
|---|---|---|---|---|
| 4,670,880 A | * | 6/1987 | Jitsukawa et al. | 714/797 |
| 4,817,091 A | * | 3/1989 | Katzman et al. | 714/8 |
| 4,817,094 A | * | 3/1989 | Lebizay et al. | 714/797 |
| 4,959,836 A | * | 9/1990 | Berard et al. | 714/822 |
| 5,193,175 A | * | 3/1993 | Cutts et al. | 714/11 |
| 5,274,554 A | * | 12/1993 | Takats et al. | 701/33 |
| 5,339,404 A | * | 8/1994 | Vandling, III | 714/1 |
| 5,550,736 A | * | 8/1996 | Hay et al. | 701/3 |
| 5,812,757 A | * | 9/1998 | Okamoto et al. | 714/11 |
| 5,903,717 A | * | 5/1999 | Wardrop | 714/12 |
| 5,923,830 A | * | 7/1999 | Fuchs et al. | 714/11 |
| 6,085,350 A | * | 7/2000 | Emmert et al. | 714/797 |
| 6,088,632 A | * | 7/2000 | Zaccaria et al. | 701/3 |
| 6,112,140 A | * | 8/2000 | Hayes et al. | 701/14 |
| 6,141,770 A | * | 10/2000 | Fuchs et al. | 714/11 |
| 6,367,031 B1 | * | 4/2002 | Yount | 714/11 |
| 6,532,550 B1 | * | 3/2003 | Crew et al. | 714/11 |
| 6,550,018 B1 | * | 4/2003 | Abonamah et al. | 714/6 |
| 6,667,520 B1 | * | 12/2003 | Fulkerson | 257/369 |
| 6,704,887 B2 | * | 3/2004 | Kwiat et al. | 714/10 |
| 6,732,300 B1 | * | 5/2004 | Freydel | 714/36 |
| 6,839,866 B2 | * | 1/2005 | Lerman | 714/13 |
| 6,862,693 B2 | * | 3/2005 | Chaudhry et al. | 714/11 |
| 6,928,583 B2 | * | 8/2005 | Griffin et al. | 714/11 |
| 6,938,183 B2 | * | 8/2005 | Bickel | 714/12 |
| 6,971,043 B2 | * | 11/2005 | McLoughlin et al. | 714/11 |
| 6,990,555 B2 | * | 1/2006 | Vorbach et al. | 711/122 |
| 7,024,594 B2 | * | 4/2006 | Pignol | 714/54 |
| 7,047,440 B1 | * | 5/2006 | Freydel et al. | 714/11 |

(Continued)

FOREIGN PATENT DOCUMENTS

EP 1 014 237 A 6/2000

*Primary Examiner*—Robert Beausoliel
*Assistant Examiner*—Elmira Mehrmanesh
(74) *Attorney, Agent, or Firm*—Fogg & Powers LLC; Gregory M. Taylor

(57) ABSTRACT

An electronic module is provided. The module includes a first logic device having at least two processors and a first comparator and a second logic device having at least one processor and a second comparator. Each of the at least two processors are coupled to each of the first and second comparators. The first and second comparators operate as a distributed comparator system. Each comparator independently identifies faults in the processors.

33 Claims, 4 Drawing Sheets

U.S. PATENT DOCUMENTS 7,065,672 B2 *  6/2006  Long et al. .................... 714/11
7,260,742 B2 *  8/2007  Czajkowski ................. 714/21
2005/0005203 A1 *  1/2005  Czajkowski .................. 714/47
2006/0200278 A1 *  9/2006  Feintuch ........................ 701/3

* cited by examiner

REDUNDANT PROCESSING ARCHITECTURE FOR SINGLE FAULT TOLERANCE

TECHNICAL FIELD

The present invention relates generally to the field of redundant architectures, and in particular, to developing a single fault tolerant architecture.

BACKGROUND INFORMATION

Space missions require the highest upset rate immunity available to overcome Single Event Upsets (SEUs). At times, electronic systems can operate outside normal parameters thereby producing faulty data. In some circumstances, failure of these systems can be catastrophic. Although radiation hardened processors are available, they offer lower performance and higher cost than commercial off the shelf processors. In order to use non-hardened devices, a fault tolerant scheme is used in architectures that include one or more redundant systems. To identify the faulty system, voting mechanisms are used. The voting mechanisms process the simultaneous outputs of the redundant systems to determine the system producing the correct data. The voting mechanisms used in these architectures are implemented through software. However, software implementations of the voting mechanisms are very slow.

One assumption using voting mechanisms is that only one fault occurs at a time. This single fault assumption allows identification of the faulty output. In some applications three systems operate simultaneously, so that when one system fails, it can be easily identified by the other two. Essentially, the third system casts the tie-breaking vote. When only two systems are used, it is possible to identify an error, but not which output is incorrect because a majority vote is required to determine the failed system.

Therefore, there is a need in the art for an improved architecture using off the shelf components that provide a faster solution to overcome the SEU problems in architectures.

SUMMARY OF INVENTION

Embodiments of the present invention address enhancing the speed of voting mechanism processes in systems with redundant processors.

In one embodiment a system is provided. The system includes a first logic device having at least two processors and a first comparator and a second logic device having at least one processor and a second comparator. Each of the at least two processors are coupled to each of the first and second comparators. The first and second comparators operate as a distributed comparator system. Each comparator independently identifies faults in the processors.

In another embodiment, a method for identifying a fault in a programmable device having at least three redundant processors each having a software implemented fault tolerance (SIFT) function is provided. The method includes generating an output at each of the at least three redundant processors, receiving the generated outputs at each of the SIFTs, performing a first portion of a comparison function using each of the SIFTs, performing a second portion of the comparison function using a hardware comparator, combining results of each of the first portion of the comparison function and the second portion of the comparison function and analyzing the combined results. The analysis includes performing a voting function of the combined results, comprising checking for a minority vote and determining faulty processors among the at least three redundant processors based on the minority vote.

DETAILED DESCRIPTION

In the following detailed description of the preferred embodiments, reference is made to the accompanying drawings that from a part hereof, and in which is shown by way of illustration specific embodiments in which the invention may be practiced. It is to be understood that other embodiments may be utilized and structural changes may be made without departing from the scope of the present invention.

Figure 1:
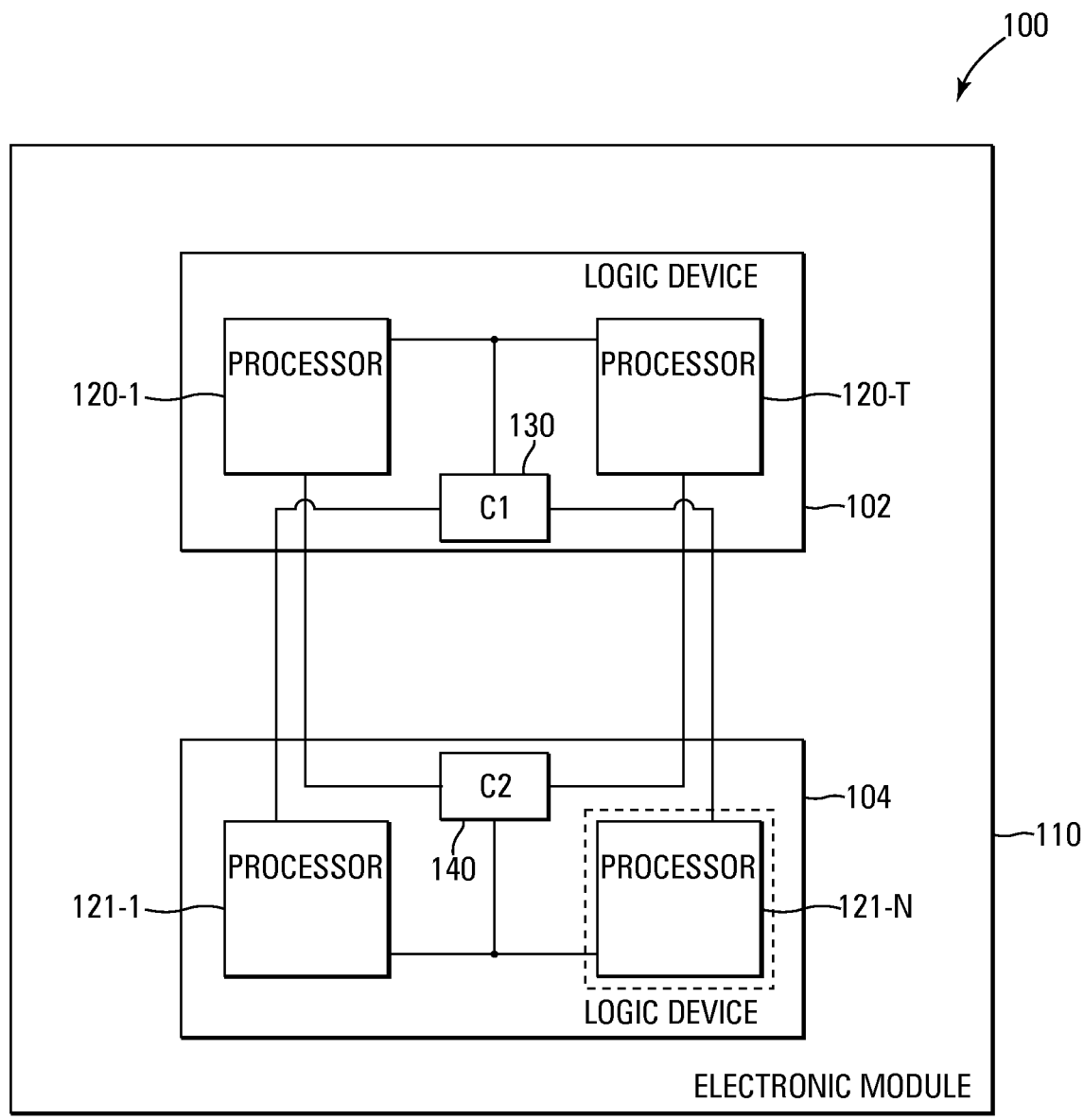
FIG. 1 is a block diagram of the architecture of one embodiment of an electronic module having redundant processors and comparators.

FIG. 1 is a block diagram of the architecture of one embodiment of an electronic module 110, indicated generally at 100 according to the teachings of the present invention. Electronic module 110 includes a single fault tolerant architecture having first and second, redundant logic devices 102 and 104. In one embodiment, the electronic module 110 is an Application Specific Integrated Chip (ASIC). In another embodiment, the electronic module 110 is a Printed Wired Assembly (PWA).

In one embodiment, logic devices 102 and 104 are field programmable gate arrays (FPGAs) that are programmed to include two processors in each. Logic device 102 includes a comparator 130 and logic device 104 includes comparator 140. Comparators 130 and 140 combine to perform the function of comparing in a distributed architecture. In one embodiment, a distributed architecture is directed to dividing or separating the comparison function into two or more units. In one embodiment, both comparators 130 and 140 perform substantially the same function and in another embodiment they complement each other and together complete the function of comparison. The distributed architecture used for comparators 130 and 140 provides an additional layer of redundancy.

In another embodiment, in order to achieve greater redundancy, the first logic device 102 has processors 120-1 through 120-T and the second logic device has processors 121-1 through 121-N. In first and second logic devices 102 and 104, processors 120-1 through 120-T and 121-1 through 121-N are programmed to perform substantially the same function. In addition to the normal system functions performed by each processor 120-1 through 120-T and 121-1 through 12 1-N, embodiments of the present invention have processors 120-1 through 120-T and 121-1 through 121-N generating output that is utilized to compare against each other for possible faults in any of the processors 120-1 through 120-T and 121-1 through 121-N. Both comparators 130 and 140 are coupled with each of processors 120-1 through 120-T and 121-1 through 121-N.

In operation, each output generated by processors 120-1 through 120-T and 121-1 through 121-N are compared against each other using a distributed comparator mechanism comprising comparators 130 and 140. Individual bit-level comparisons are performed and the results are then redistributed to the processors 120-1 through 120-T and 121-1 through 121-N. Since the comparison is performed in hardware it is faster than software implementations that maybe run on processors 120-1 through 120-T and 121-1 through 121-N. In one embodiment, comparators 130 and 140 are identical and hence provide additional redundancy in performing a fault identification function. In another embodiment, comparators 130 and 140 share the workload of comparing the processor outputs and thereby reduce the total processing time. Comparators 130 and 140 depend on each others results to complete the fault identification function.

In one embodiment, the electronic module 110 includes at least three redundant processors 120-1 to 120-T and 121-1 to 121-N. It is required that a minimum of three redundant processors will be necessary to determine a single faulty processor among processors 120-1, 120-T, 121-1 and 121-N. When only two processors are present, the fact that a faulty processor exists can be identified, but which processor is faulty cannot be determined. The addition of a third processor provides a tie-breaking vote in determining the faulty processor.

Figure 2:
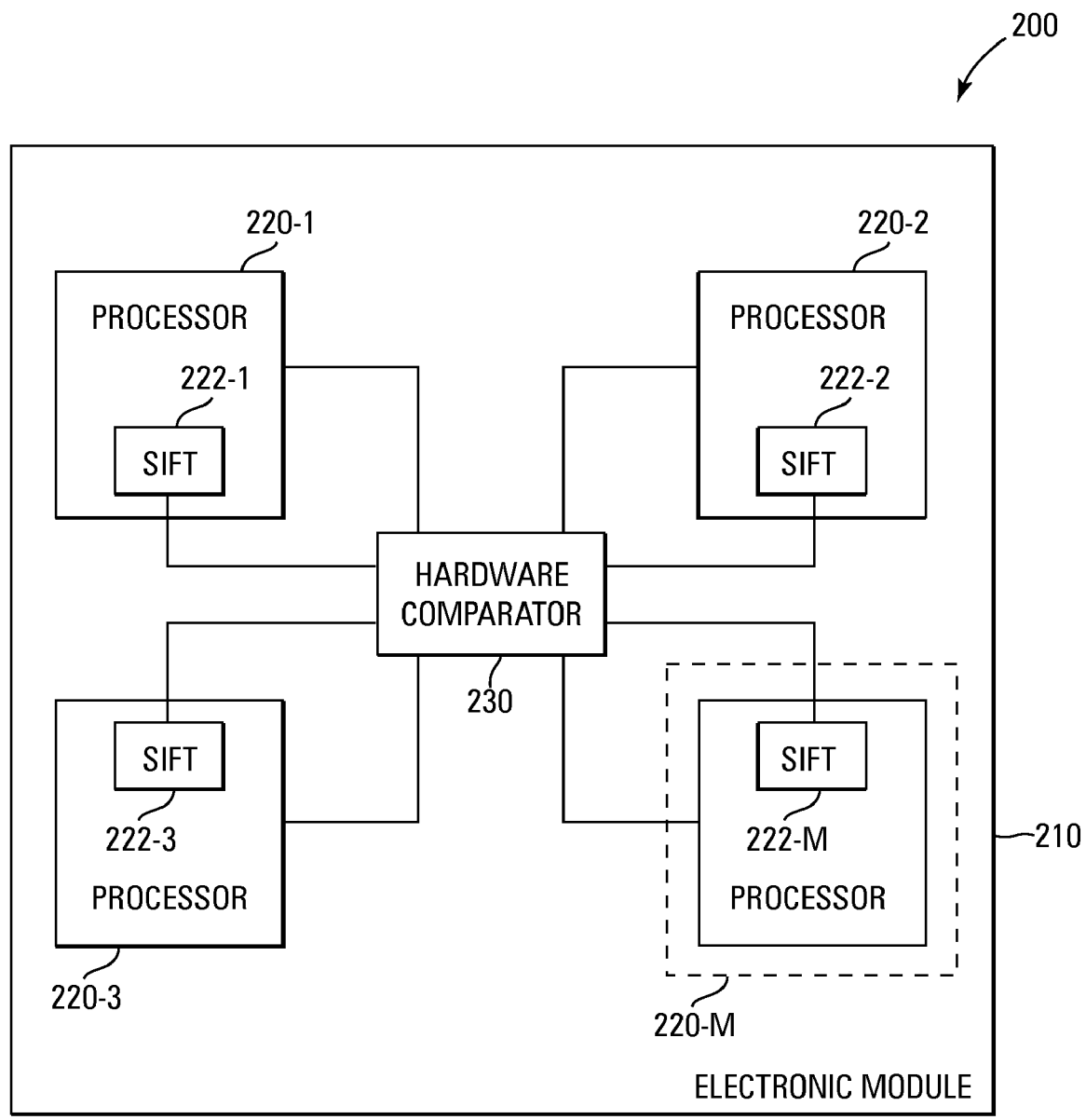
FIG. 2 is a block diagram of the architecture of one embodiment of a programmable logic device having redundant processors, software implemented fault tolerance functions and a hardware comparator.

FIG. 2 is a block diagram of the architecture of one embodiment of an electronic module 210, indicated generally at 200 according to the teachings of the present invention. In one embodiment, electronic module 210 includes one or more optional processors 220-1 to 220-M. In one embodiment, electronic module 210 operates essentially as a programmable logic device. In another embodiment, processors 220-1 through 220-M are separate processors separated from electronic module 210. In each of these embodiments processors 220-1 to 220-M are independent and are de-coupled from each other for the architecture to be radiation hardened.

In one embodiment, the electronic module 210 includes at least three redundant processors 220-1 to 220-M. It is required that a minimum of three redundant processors will be necessary to determine a single faulty processor among processors 220-1, 220-2 and 220-3. In the event there are only two processors 220-1 and 220-2 present, the fact that a faulty processor exists can be identified, however, which one of the two processors 220-1 and 220-2 is faulty cannot be determined. The addition of a third processor will provide the tie-breaker vote in determining the faulty processor.

In FIG. 2, processors 220-1 to 220-M perform substantially the same function. Each of processors 220-1 to 220-M includes a software implemented fault tolerance (SIFT) function represented by 222-1 to 222-M. SIFT 222-1 through 222-M is a programming interface that has a library set to perform the function of comparison, management, voting and reset functions with regard to the processors 220-1 through 220-M. SIFT 222-1 through 222-M supports the detection of a single event error of one of the processors 220-1 through 220-M. In one embodiment, the operation of SIFT functions 222-1 through 222-M are de-coupled to perform independently from the operations of the processors 220-1 through 220-M. The comparison is performed at some application (e.g., SIFT) designated checkpoint. Each SIFT 222-1 through 222-M performs its tasks at some pre-determined application period that is specified by the designer. In one embodiment, also included in the electronic module 210 is a hardware comparator 230 that is implemented in the remaining space of the electronic module 210. Hardware comparator 230 reduces the time and effort to perform the comparison function executed by each of the SIFTs 222-1 through 222-M and relieves some of the burden of executing the comparison function for SIFT 222-1 through 222-M. In one embodiment, the hardware comparator 230 is radiation hardened by using a triple modular redundancy (TMR) implementation.

In one operation, the SIFT software 222-1 through 222-M is executed on each processor. As the software is being executed, a portion of the comparison function is forwarded to the hardware comparator 230 to perform the bit-level comparison in hardware. The hardware comparator 230 enhances SIFT 222-1 through 222-M in performing the comparison faster through hardware. After the completion of the comparison task, the hardware comparator 230 forwards the results to SIFT 222-1 through 222-M. Upon completion of the execution of the SIFT software, the results are forwarded to each of the processors 220-1 through 220-M. In one embodiment, each SIFT 222-1 through 222-M sends a message to the faulty processor among processors 220-1 through 220-M to initialize or reset the processor. In one embodiment, the faulty processor may also receive a copy of the current image of one of the other processors 220-1 through 220-M that would enable it to continue its duties as required.

Figure 3:
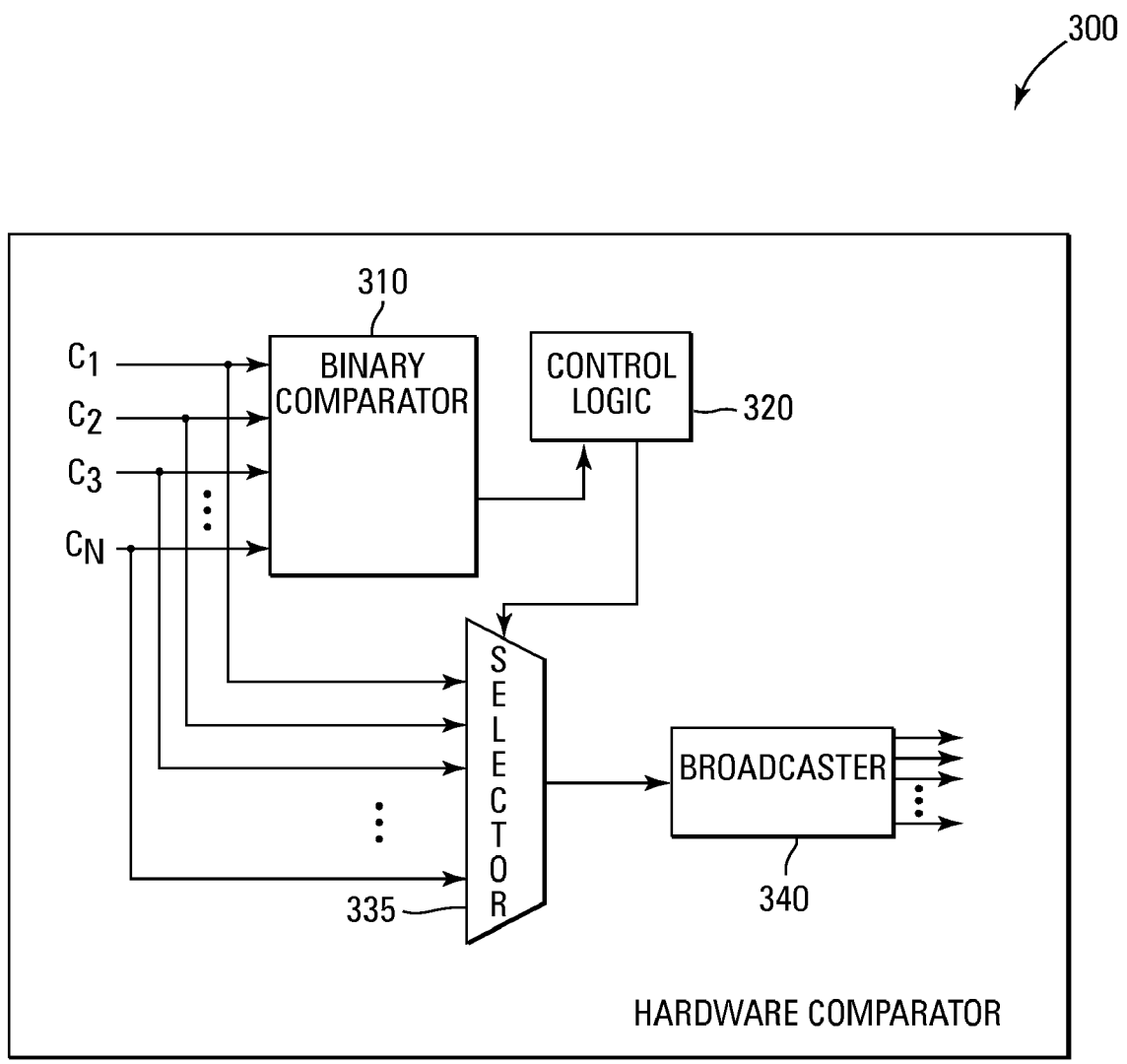
FIG. 3 is a block diagram of one embodiment of a hardware comparator.

FIG. 3 is a block diagram of one embodiment of a hardware comparator, indicated generally at 300. In one embodiment, hardware comparator 300 is as found in FIG. 2 above labeled as 230. Hardware comparator 300 comprises a binary comparator 310, control logic 320, selector 335 and a broadcaster 340. In one embodiment, binary comparator 310 is coupled to a control logic device 320 which in turn is coupled to a selector 330.

In operation, each of SIFT 222-1 through 222-M generates outputs $C_1$-$C_N$. Outputs $C_1$ through $C_N$ are received by a binary comparator 310. The binary comparator 310 performs a bit-level comparison to detect any change in bit positions between processor outputs thereby determining if there is a faulty or failed processor. The result of the bit comparison in binary comparator 310 is forwarded to control logic device 320. Control logic device 320 generates a control signal based on the comparison results. The control signal from control logic device 320 triggers selector 330. In the event of a failed processor, the control signal from control logic device 320 triggers selector 330 to choose an output other than the failed output to be sent to broadcaster 340. Broadcaster 340 broadcasts the chosen signal back to all the processors 120-1 through 120-T, 121-1 through 121-N and 220-1 through 220-M and the failed processor is reset consequently.

Figure 4:
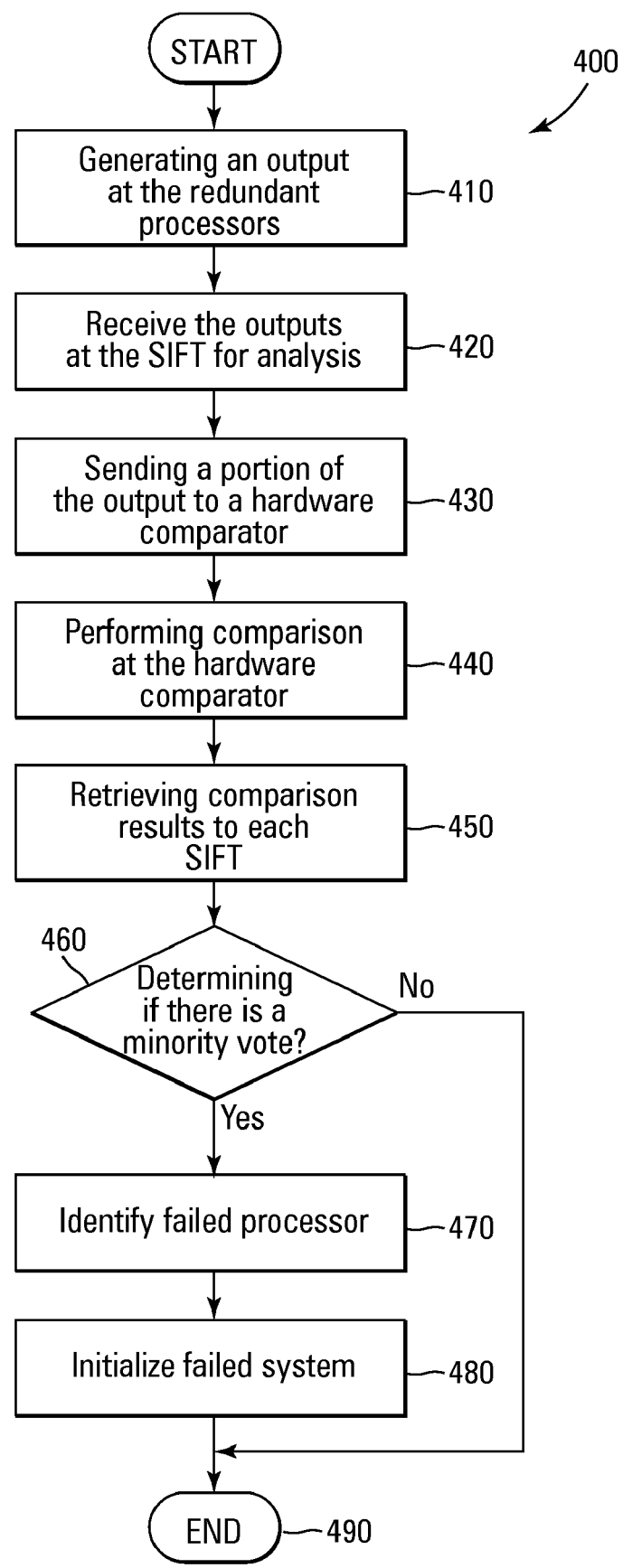
FIG. 4 is a flowchart of one embodiment of a method for accelerating a voting mechanism in a programmable device.

FIG. 4 is a flow chart of one embodiment of a method for accelerating a voting mechanism in an electronic module as shown generally at 400, according to the teachings of the present invention. Method 400 is performed by an electronic module such as electronic module 210 shown in FIG. 2 above. The electronic module includes a hardware comparator and at least three or more redundant systems each having a software implemented fault tolerance function. The method begins at block 410 where each of the redundant processors generates an output for analysis. At block 420, each of the outputs from the redundant processors are received by the SIFT. A portion of the output is sent to a hardware comparator in block 430. The method then proceeds to block 440 and performs a comparison process in the hardware comparator. The method proceeds to block 450 and the results of the comparison process are retrieved by the SIFT. In block 460 the results are checked to determine if there is a minority vote. When there is no minority vote the method proceeds to block 490 where it is terminated. The presence of no minority vote would indicate to all of the processors that there are no faulty processors present.

Alternatively, when there is a minority vote, the method proceeds to block 470. At block 470, the failed processors are identified, assuming that the number of failed processors is less than the number of properly working processors. The method then proceeds to block 480 where the identified failed processors are initialized or corrective action is performed on it. Following block 480, the method terminates at block 490.

CONCLUSION

Embodiments of the present invention have been described. The embodiments provide a redundant architecture that can increase the speed of the voting mechanism. Ordinarily, the voting mechanism is performed using a software process. This invention reduces the time taken to perform the voting process and also reduces the effort of the software by transferring critical bit comparison operation and performing it in a hardware device on the same programmable device. The electronic module of the described invention can be assembled using many off the shelf components in providing a faster solution to overcome SEU problems. This is particularly advantageous for overcoming SEU problems in architectures used in space applications.

Although specific embodiments have been illustrated and described in this specification, it will be appreciated by those of ordinary skill in the art that any arrangement that is calculated to achieve the same purpose may be substituted for the specific embodiment shown. This application is intended to cover any adaptations or variations of the present invention.

What is claimed is:

1. A system comprising:
    a first logic device having at least two processors and a first comparator; and
    a second logic device having at least one processor and a second comparator;
    wherein each of the at least two processors are coupled to each of the first and second comparators;
    wherein the first and second comparators operate as a distributed comparator system;
    wherein each comparator independently identifies faults in the processors.

2. The system of claim 1, wherein the first and second logic devices are programmable.

3. The system of claim 1, wherein each of the first and second comparators perform a comparison function in software.

4. The system of claim 1, wherein each of the first and second comparators is a hardware device.

5. The system of claim 1, wherein each of the first and second logic devices is a field programmable gate array.

6. A logic device comprising:
    at least three processors that are adapted to perform substantially the same function;
    at least one hardware comparator comprising:
        a binary comparator;
        a control logic device coupled to the binary comparator;
        a selector coupled to the control logic device; and
        a broadcaster coupled to the selector;
    wherein each of the at least three processors includes a software implemented fault tolerance function (SIFT);
    wherein each of the at least three SIFTs is communicatively coupled to the at least one hardware comparator; and
    wherein each of the SIFTs operates independently of each other to identify faults in one or more of the at least three processors;
    wherein the logic device is configured to:
        perform a first portion of a comparison function using each of the SIFTs;
        perform a second portion of the comparison function using the hardware comparator;
        forward results from the second portion of the comparison function to each of the SIFTs; and
        combine results of each of the first portion of the comparison function and the second portion of the comparison function.

7. The logic device in claim 6, wherein the logic device is programmable.

8. The logic device of claim 6, wherein the logic device is a field programmable gate array.

9. The logic device in claim 6, wherein the hardware comparator is radiation hardened.

10. A system comprising:
    a logic device having at least three processors; and
    at least one hardware comparator coupled to each of the at least three processors, the hardware comparator comprising:
        a binary comparator;
        a control logic device coupled to the binary comparator;
        a selector coupled to the control logic device; and
        a broadcaster coupled to the selector;
    wherein each processor includes a software implemented fault tolerance (SIFT) function;
    wherein the SIFT and the at least one hardware comparator in combination processes outputs of the at least three processors;
    wherein the SIFT determines if one or more of the at least three processors has failed;
    wherein the logic device is configured to:
        perform a first portion of a comparison function using each SIFT;
        perform a second portion of the comparison function using the hardware comparator;
        retrieve results of each of the first portion of the comparison function and the second portion of the comparison function; and
        forward results from the second portion of the comparison function to each SIFT.

11. The system of claim 10, wherein the logic device is programmable.

12. The system of claim 10, wherein the logic device is a field programmable gate array.

13. The system of claim 10, wherein the at least one hardware comparator is radiation hardened.

14. A method for identifying a fault in a programmable device having at least three redundant processors each having a software implemented fault tolerance (SIFT) function, the method comprising:
    generating an output at each of the at least three redundant processors;
    receiving the generated outputs at each of the SIFTs;
    performing a first portion of a comparison function using each of the SIFTs;
    performing a second portion of the comparison function using a hardware comparator;
    forwarding results from the second portion of the comparison function to each of the SIFTs;
    combining results of each of the first portion of the comparison function and the second portion of the comparison function; and
    analyzing the combined results, wherein the analysis comprises:
        performing a voting function of the combined results, comprising checking for a minority vote; and
        determining faulty processors among the at least three redundant processors based on the minority vote.

15. The method of claim 14, further comprising initializing the faulty processor when a minority vote is achieved.

16. The method in claim 14, wherein the hardware comparator is radiation hardened.

17. The method in claim 14, wherein the programmable device is a field programmable gate array.

18. A method for accelerating a voting mechanism in a programmable device having at least three redundant processors each having a software implemented fault tolerance (SIFT) function, the method comprising:
   generating an output in each of the at least three redundant processors;
   receiving the generated outputs at each of the SIFTs;
   performing a first portion of a comparison function using each of the SIFTs;
   performing a second portion of the comparison function using a hardware comparator;
   retrieving results of each of the first portion of the comparison function and the second portion of the comparison function; and
   forwarding results from the second portion of the comparison function to each of the SIFTs.

19. The method of claim 18, wherein the hardware comparator is radiation hardened.

20. The method of claim 18, wherein the programmable device is a field programmable gate array.

21. The method of claim 18, wherein the programmable device is an application specific integrated chip.

22. An electronic module, comprising:
   a first logic device having at least two processors and a first comparator; and
   a second logic device having at least one processor and a second comparator;
   wherein each of the at least two processors are coupled to each of the first and second comparators;
   wherein the first and second comparators operate as a distributed comparator system;
   wherein each comparator independently identifies faults in the processors;
   wherein the logic devices are combined on a single chip.

23. The electronic module of claim 22, wherein the first and second logic devices are programmable.

24. The electronic module of claim 22, wherein each of the first and second comparators perform a comparison function in software.

25. The electronic module of claim 22, wherein each of the first and second comparators are hardware devices.

26. The electronic module of claim 22, wherein each of the first and second logic devices is a field programmable gate array.

27. A machine readable medium having instructions stored thereon for identifying a fault in a programmable device having at least three redundant processors each having a software implemented fault tolerance (SIFT) function, the method comprising:
   generating an output at each of the at least three redundant processors;
   receiving the generated outputs at each of the SIFTs;
   performing a first portion of a comparison function using each of the SIFTs;
   performing a second portion of the comparison function using a hardware comparator;
   forwarding results from the second portion of the comparison function to each of the SIFTs;
   combining results of each of the first portion of the comparison function and the second portion of the comparison function; and
   analyzing the combined results, wherein the analysis comprises:
      performing a voting of the combined results comprising checking for a minority vote; and
      determining faulty processors among the at least three redundant processors based on the minority vote.

28. The method of claim 27, further comprising initializing the faulty processor when a minority vote is achieved.

29. The method of claim 27, wherein the programmable device is a field programmable gate array.

30. A machine readable medium having instructions stored thereon for accelerating a voting mechanism in a programmable device having at least three redundant processors each having a software implemented fault tolerance (SIFT) function, the method comprising:
   generating an output in each of the at least three redundant processors;
   receiving the generated outputs at each of the SIFTs;
   performing a first portion of a comparison function using each of the SIFTs;
   performing a second portion of the comparison function using a hardware comparator;
   retrieving results of each of the first portion of the comparison function and the second portion of the comparison function; and
   forwarding results from the second portion of the comparison function to each of the SIFTs.

31. The method of claim 30, wherein the hardware comparator is radiation hardened.

32. The method of claim 30, wherein the programmable device is a field programmable gate array.

33. The method of claim 30, wherein the programmable device is an application specific integrated chip.

* * * * *